United States Patent

Nagata et al.

Patent Number: 5,567,744
Date of Patent: Oct. 22, 1996

[54] HIGH WATER-ABSORBENT RESIN COMPOSITION

[75] Inventors: Manabu Nagata; Takushi Yamamoto; Shinichi Takemori; Naoyuki Hashimoto, all of Himeji; Hiroki Ishikawa; Yozo Yamada, both of Kakegawa, all of Japan

[73] Assignees: Sumitomo Seika Chemicals Co., Ltd., Hyogo; Uni-Charm Corporation, Ehime, both of Japan

[21] Appl. No.: 338,468

[22] PCT Filed: May 10, 1993

[86] PCT No.: PCT/JP93/00612

§ 371 Date: Nov. 17, 1994

§ 102(e) Date: Nov. 17, 1994

[87] PCT Pub. No.: WO93/24575

PCT Pub. Date: Dec. 9, 1993

[30] Foreign Application Priority Data

May 23, 1992 [JP] Japan ................... 4-155654

[51] Int. Cl.$^6$ ................ C08K 9/00; C08F 6/00; C08G 61/00; C08L 83/00
[52] U.S. Cl. ............. 523/200; 523/201; 523/205; 523/206; 428/357; 428/402.24; 428/407; 428/423.1
[58] Field of Search ................ 523/200, 201, 523/205, 206; 428/357, 402.24, 407, 423.1

[56] References Cited

FOREIGN PATENT DOCUMENTS

| | | |
|---|---|---|
| 0273141 | 7/1988 | European Pat. Off. |
| 0478150 | 4/1992 | European Pat. Off. |
| 54-130686 | 10/1979 | Japan |
| 54-153886 | 12/1979 | Japan |
| 55-5939 | 1/1980 | Japan |
| 63-145485 | 6/1988 | Japan |
| 63-172723 | 7/1988 | Japan |
| 1-252669 | 10/1989 | Japan |
| 2-242858 | 9/1990 | Japan |
| 5-507511 | 10/1993 | Japan |
| 18042 | 11/1991 | WIPO |
| 9118042 | 11/1991 | WIPO |

OTHER PUBLICATIONS

Abstract of JP-A-57 178 746, publication date Nov. 4, 1982.
Abstract of JP-A-2 172 739, publication date Jul. 4, 1990.
Abstract of JP-A-63 172 645, publication date Jul. 16, 1988.

*Primary Examiner*—Paul R. Michl
*Assistant Examiner*—Patrick Niland
*Attorney, Agent, or Firm*—Birch, Stewart, Kolasch & Birch, LLP

[57] ABSTRACT

The present invention is concerned with a high water-absorbent resin composition, produced by forming a composite by fusing or fixing a thermoplastic resin onto a surface of a high water-absorbent resin via an adhesive binder or directly, wherein the composition comprises from 1 to 100 parts by weight of the thermoplastic resin, based on 100 parts by weight of the high water-absorbent resin.

When the high water-absorbent resin composition of the present invention is used, it is possible to securely adhere a high water-absorbent resin to a fibrous base material, so that a water-absorbent material which stably retains the high water-absorbent resin even after absorbing water can be obtained. Accordingly, the base materials, such as fibrous base materials, can retain more amount of high water-absorbent resin than those of conventional water-absorbent materials. Thus, it is possible to provide water-absorbent composites suitable for various applications, including hygienic materials, such as paper diapers and sanitary napkins, and agricultural, horticultural, food, and other industrial materials.

11 Claims, No Drawings

HIGH WATER-ABSORBENT RESIN COMPOSITION

TECHNICAL FIELD

The present invention relates to a high water-absorbent resin composition prepared by forming a composite by fusing or fixing a thermoplastic resin onto the surface of a high water-absorbent resin. The high water-absorbent resin composition obtained by the present invention has enhanced adhesion. For example, when the high water-absorbent resin composition of the present invention is used in adhesion to fibrous base materials such as various nonwoven fabrics, pulps or papers, it provides a high water-absorbent material which is not detached from the fibrous base materials even after which the high water-absorbent resin absorbs water.

BACKGROUND ART

The high water-absorbent resin is a functional resin capable of absorbing and retaining water from several dozens to 1000 times the weight thereof, and because of this property, it is widely utilized in hygienic materials such as paper diapers and sanitary napkins and agricultural and horticultural materials.

However, these high water-absorbent resins are usually in the form of powders having no adhesion, and in order to use them in the above-mentioned applications, the mentioned resin is spread over fibrous base materials such as nonwoven fabrics, pulps or papers to obtain a water-absorbent material with a sandwich structure. In this case, in order to fix the high water-absorbent resin to the base material, a method comprising slightly swelling the resin by water spraying and then subjecting the swollen resin to embossing or press drying using a roll is normally carried out.

However, the conventional method for fixing the high water-absorbent resin mentioned above has some drawbacks as mentioned below. Specifically, in the method for fixing a high water-absorbent resin to a fibrous base material by water spraying, etc., the insufficient adhesion to the base material results in gel detachment upon water absorption, so that the amount of the high water-absorbent resin to be added for the prevention of the gel detachment is limited. Also, in the case where the water is used, a drying process becomes necessary for subsequent water removal, and at the same time, the touch of the product is affected.

An object of the present invention is to provide a high water-absorbent resin composition having enhanced adhesion to the base material by giving adhesion to the high water-absorbent resin having non-thermoplasticity, which is not detached from the fibrous base material mentioned above even after the high water-absorbent resin absorbs water in the case where it is used in the thermal adhesion to fibrous base materials, such as nonwoven fabrics, pulps or papers.

DISCLOSURE OF THE INVENTION

As a result of intense investigations in view of the above-mentioned circumstances, the present inventors have found that the desired object of the present invention can be accomplished by forming a composite by fusing or fixing a thermoplastic resin directly or via an adhesive binder onto the surface of a high water-absorbent resin, and thus have completed the present invention.

Specifically, the gist of the present invention is concerned with:

(1) A high water-absorbent resin composition, produced by forming a composite by fusing or fixing a thermoplastic resin onto a surface of a high water-absorbent resin via an adhesive binder, wherein the composition comprises from 1 to 100 parts by weight of the thermoplastic resin and from 1 to 75 parts by weight of the solid component of the adhesive binder, based on 100 parts by weight of the high water-absorbent resin;

(2) A high water-absorbent resin composition, produced by forming a composite by fusing or fixing a thermoplastic resin onto a surface of a high water-absorbent resin, wherein the composition comprises from 1 to 100 parts by weight of the thermoplastic resin, based on 100 parts by weight of the high water-absorbent resin;

(3) The high water-absorbent resin composition mentioned above, wherein the adhesive binder used is a urethane adhesive;

(4) The high water-absorbent resin composition mentioned above, wherein the high water-absorbent resin used has an average grain size of from 5 to 1000 μm, and the thermoplastic resin is a granular product having an average grain size of from 1 to 800 μm, or a fibrous product having an average diameter of from 1 to 400 μm and an average length of from 2 to 1000 μm;

(5) The high water-absorbent resin composition mentioned above, wherein the melting point of the thermoplastic resin used is from 50° to 200° C.; and (6) The high water-absorbent resin composition mentioned above, wherein the softening point of the thermoplastic resin used is from 40° to 200° C.

BEST MODE FOR CARRYING OUT THE INVENTION

The high water-absorbent resin which can be used in the present invention is not particularly subject to limitation, almost all commercially available products can be used, as long as they have water-absorbent capacity of from several dozens to 1000 times as much as their own weights such as those normally used for hygienic materials such as paper diapers, sanitary napkins, etc. and agricultural and horticultural materials. Illustrative examples thereof include crosslinked acrylate polymers, crosslinked products of vinyl alcohol-acrylate copolymers, crosslinked products of polyvinyl alcohols grafted with maleic anhydride, cross-linked products of acrylate-methacrylate copolymers, crosslinked saponification products of methyl acrylate-vinyl acetate copolymers, crosslinked products of starch-acrylate graft copolymers, crosslinked saponification products of starch-acrylonitrile graft copolymers, crosslinked products of carboxymethyl cellulose polymers, and crosslinked products of isobutyrene-maleic anhydride copolymers. These high water-absorbent resins may be used singly or in combination of two or more kinds.

The average grain size of the above high water-absorbent resin which can be used in the present invention is normally from 5 to 1000 μm, preferably from 20 to 800 μm. For those having finer sizes than 5 μm, its handling becomes difficult, and for those having an average grain size larger than 1000 μm, uniform dispersion becomes difficult when the obtained high water-absorbent resin composition is spread over a fibrous base material, so that it would be difficult to obtain a uniform swollen body after water absorption.

As for the thermoplastic resin used in the present invention, a granular product or fibrous product may be used. For thermoplastic resins which are granular products, the average grain size is normally from 1 to 800 μm, preferably from 5 to 500 μm. For thermoplastic resins which are fibrous products, the average diameter is normally from 1 to 400 μm, preferably from 5 to 200 μm and the average length is normally from 2 to 1000 μm, preferably from 10 to 800 μm. Also, the thermoplastic resins having a melting point of normally from 50° to 200° C., preferably from 50° to 170° C., or the thermoplastic resins having a softening point of normally from 40° to 200° C., preferably from 40° to 170° C. can be used. When the thermoplastic resins have a melting point of lower than 50° C., much care in handling is required, and when they have a melting point exceeding 200° C., a treatment at a higher temperature in the subsequent adhesion to the fibrous base material is required, making it economically disadvantageous. For the same reasons as above, those having a softening point outside the above-mentioned range are undesirable.

The materials for the thermoplastic resins mentioned above are not particularly subject to limitation, including, for example, ethylene-vinyl acetate copolymers, ethylene-acrylic acid copolymers, ethylene-acrylic ester copolymers, ethylene-acrylic ester-maleic anhydride terpolymers, polyethylene, low-molecular weight polyethylene waxes, polyesters, polyurethanes, polyamides, polypropylene, and rosin resins, petroleum resins, and terpene resins which are each known as tackifier resins, and modified products thereof, which may be used singly or in a mixture thereof. Among them, those used in hot melt adhesives, such as ethylene-vinyl acetate copolymers, polyethylene, ethylene-acrylic acid copolymers, polyamides, and polyesters, are suitably used. These thermoplastic resins may be used singly or in combination of two or more kinds.

The first embodiment of the present invention is a high water-absorbent resin composition characterized by forming a composite by fusing or fixing a thermoplastic resin onto the surface of the above-mentioned high water-absorbent resin via an adhesive binder in such a small amount so as not to lower the water-absorption capacity, water-absorption rate and other properties inherent in the high water-absorbent resin.

The methods for obtaining the high water-absorbent resin composition of the first embodiment mentioned above are not particularly subject to limitation. For example, (1) A method of forming a composite comprising stirring and mixing the high water-absorbent resin and the adhesive binder; adding the thermoplastic resin, followed by further stirring and mixing; distilling off the solvent in the adhesive binder while heating; and then raising the temperature to a temperature near the softening point or melting point of the thermoplastic resin or the adhesive binder, and thereby the thermoplastic resin is softened and fused onto the surface of the high water-absorbent resin; and (2) A method of forming a composite comprising stirring and mixing the high water-absorbent resin and the adhesive binder; adding the thermoplastic resin, followed by further stirring and mixing; distilling off the solvent in the adhesive binder while heating, and thereby the thermoplastic resin is fixed onto the surface of the high water-absorbent resin via the adhesive binder may be employed.

In the present specification, "fusing a thermoplastic resin onto a surface of a high water-absorbent resin" means that a thermoplastic resin is adhered onto a surface of a high water-absorbent resin by applying heat to a thermoplastic resin or adhesive binder to soften and melt it. Also, "fixing a thermoplastic resin onto a surface of a high water-absorbent resin" means that a thermoplastic resin is adhered onto a surface of a high water-absorbent resin by methods other than those mentioned above.

Here, the formulation ratio of the high water-absorbent resin mentioned above to the thermoplastic resin mentioned above is from 1 to 100 parts by weight, preferably from 5 to 75 parts by weight, of the thermoplastic resin, based on 100 parts by weight of the high water-absorbent resin. This is because when the amount is less than 1 part by weight, sufficient adhesion to the high water-absorbent resin cannot be provided, and when the amount exceeds 100 parts by weight, no further effects are achieved, and rather the water-absorbent performance of the high water-absorbent resin is undesirably inhibited. Also, the proportion of the solid component of the adhesive binder used in coating the high water-absorbent resin is appropriately from 1 to 75 parts by weight, preferably from 2 to 50 parts by weight, based on 100 parts by weight of the high water-absorbent resin. This is because when the amount is less than 1 part by weight, no corresponding effects are achieved, and when the amount exceeds 75 parts by weight, the water-absorbent capacity of the high water-absorbent resin is undesirably inhibited.

Examples of the adhesive binders used herein include polyurethane-based adhesives, such as polyether urethane-epoxy adhesives, polyester urethane-epoxy adhesives, polyester urethane adhesives, and polyether urethane adhesives, epoxy adhesives, vinyl chloride adhesives, acrylic adhesives, vinyl acetate adhesives, and synthetic rubber adhesives. In particular, favorable results are often obtained in the cases where urethane-based adhesives, such as polyester urethane adhesives, polyether urethane adhesives or polyether urethane-epoxy adhesives, are used. These adhesive binders may be used singly or in combination of two or more kinds.

The second embodiment of the present invention is a high water-absorbent resin composition characterized by forming a composite by fusing or fixing a thermoplastic resin directly onto the surface of the above-mentioned high water-absorbent resin without lowering the water-absorption capacity, water-absorption rate, etc. inherent in the high water-absorbent resin. In this case, it differs from the first embodiment in that the composite is formed by directly fusing or fixing the thermoplastic resin without using an adhesive binder.

Methods for obtaining such a high water-absorbent resin composition of the second embodiment in which an adhesive binder is not used are not particularly subject to limitation. For example, (1) A method of forming a composite comprising raising the temperature to a temperature near the softening point or the melting point of the thermoplastic resin while mixing and stirring the high water-absorbent resin and the thermoplastic resin, and thereby the thermoplastic resin is softened and fused onto the surface of the high water-absorbent resin; and (2) A method of forming a composite comprising adding the thermoplastic resin during the production process of the high water-absorbent resin, e.g., at the time of, or after completion of, monomer polymerization; and heating and drying, and thereby the thermoplastic resin is fixed onto the surface of the high water-absorbent resin may be employed.

Here, as in the case of the first embodiment mentioned above, the formulation ratio of the high water-absorbent resin to the thermoplastic resin is from 1 to 100 parts by weight of the thermoplastic resin, preferably from 5 to 75 parts by weight, based on 100 parts by weight of the high water-absorbent resin. This is because when the amount is less than 1 part by weight, sufficient adhesion to the high water-absorbent resin cannot be provided, and when the amount exceeds 100 parts by weight, no corresponding effects are achieved, and rather the water-absorbent capacity of the high water-absorbent resin is undesirably inhibited.

The high water-absorbent resin composition of the present invention is applicable to various base materials to obtain high water-absorbent materials. Examples of the base materials include fibrous base materials, such as nonwoven fabrics, pulps, and papers, which may be processed to sheet and other forms. For example, the high water-absorbent resin composition of the present invention is spread over fibrous base materials such as nonwoven fabrics, pulps or papers, or alternatively, it is combined with an additional suitable base material to give a sandwich structure, followed by thermal adhesion at 50° to 200° C. By the above process, the thermoplastic resin grains fused or fixed onto the surface of the high water-absorbent resin are fused and strongly adhered onto the fibrous base material, so that an excellent water-absorbent material can be easily obtained, wherein the water-absorbent gel is not detached from the base material even at the time of water absorption.

There are two kinds of embodiments, as illustrated by the first embodiment and the second embodiment as explained above, which are appropriately selected and used depending upon its applications. Although both embodiments show strong adhesion to base materials such as fibrous base materials, the first embodiment using an adhesive binder is preferably used in applications demanding a stronger adhesion.

The present invention will be explained in further detail below by means of the following Examples, etc., but the present invention is not limited to these Examples.

EXAMPLE 1

100 parts by weight of a high water-absorbent resin (trade name: "AQUA KEEP SA-60," based on polyacrylate, average grain size 450 μm, manufactured by Sumitomo Seika Chemicals Co., Ltd.) was placed in a bench-type kneader having an inside volume of 1 liter (PNV-IH model: manufactured by Irie Shokai), and 10 parts by weight, calculated as the solid component of an adhesive binder (a) shown in Table 1, was added with stirring, followed by stirring and mixing at room temperature for 5 minutes, after which 20 parts by weight of a powdered low-density polyethylene (trade name: "FLOTHENE A-1003," average grain size 300 μm, melting point 106° C., manufactured by Sumitomo Seika Chemicals Co., Ltd.) was added and mixed.

After stirring and mixing for 5 more minutes, the temperature was raised to 100° C. to distill off the solvent in the adhesive binder to yield a high water-absorbent resin composition of the present invention, in which the thermoplastic resin was fixed around the high water-absorbent resin and formed as a composite.

TABLE I

| Adhesive Binder | | Component |
|---|---|---|
| <Polyether Urethane-Epoxy Based Adhesives> | | |
| (a) | ADCOTE 391A | (Main Agent, Solid Comp.: 60%): 100 parts by weight (manufactured by Toyo Morton Co., Ltd.) |
| | ADCOTE 391B | (Curing Agent, Solid Comp.: 70%): 10 parts by weight (manufactured by Toyo Morton Co., Ltd.) |
| | Ethanol | 24 parts by weight |
| <Polyester-Based Urethane Adhesives> | | |
| (b) | HI-BON 7031L | (Solid comp.: 20%): 100 parts by weight (manufactured by Hitachi Kasei Polymer Co., Ltd.) |
| | SUMIDUR L-75 | (Curing Agent, Solid Comp.: 75%): 2 parts by weight (manufactured by Sumitomo Bayer Urethane Co., Ltd.) |
| <Polyurethane-Based Adhesives> | | |
| (c) | HI-BON 4050 | (Solid comp.: 25%): 100 parts by weight (manufactured by Hitachi Kasei Polymer Co., Ltd.) |
| | DESMODUR R | (Curing Agent, Solid Comp.: 20%): 5 parts by weight (manufactured by Sumitomo Bayer Urethane Co., Ltd.) |
| <Polyether-Based Urethane Adhesives> | | |
| (d) | ADCOTE BHS-6020A | (Main Agent, Solid Comp.: 75%): 100 parts by weight (manufactured by Toyo Morton Co., Ltd.) |
| | ADCOTE BHS-6020C | (Curing Agent, Solid Comp.: 35%): 10 parts by weight (manufactured by Toyo Morton Co., Ltd.) |
| | Ethyl Acetate: | 21 parts by weight |
| <Vinyl Acetate Adhesives> | | |
| (e) | BOND KE60 | (Solid comp.: 50%): 100 parts by weight (manufactured by Konishi Co., Ltd.) |

EXAMPLES 2–5

The high water-absorbent resins and the thermoplastic resins shown in Table 2 and the adhesive binders shown in Table 1 were used to obtain the high water-absorbent resin compositions of the present invention, in which the thermoplastic resins were fused or fixed around the high water-absorbent resins and formed as composites in the same manner as in Example 1.

EXAMPLE 6

100 parts by weight of a high water-absorbent resin (trade name: "AQUA KEEP 10SH-NF," based on polyacrylate, average grain size 60 μm, manufactured by Sumitomo Seika Chemicals Co., Ltd.) and 10 parts by weight of a spherical ethylene-acrylic acid copolymer (trade name: "FLOBEADS EA-209," average grain size 10 μm, melting point about 90° C., manufactured by Sumitomo Seika Chemicals Co., Ltd.) were placed in a separable glass flask having an inside volume of 500 ml, the temperature was raised to 100° C.

under stirring, and the mixture was kept standing at 100° C. for 15 minutes. The mixture was then allowed to cool under stirring to yield a high water-absorbent resin composition of the present invention, in which the thermoplastic resin was fused around the high water-absorbent resin and formed as a composite.

EXAMPLE 7

A high water-absorbent resin composition, in which the thermoplastic resin was fixed around the high water-absorbent resin and formed as a composite, was obtained by adding the thermoplastic resin when producing the high water-absorbent resin by reverse phase suspension polymerization. Specifically, 550 ml of n-heptane was placed in a 1-liter four-necked cylindrical round bottom flask, equipped with a stirrer, a reflux condenser, a dropping funnel, and a nitrogen gas inlet tube, and 1.38 g of hexaglyceryl monobehenylate having an HLB value of 13.1 (trade name: "NON-ION GV-106," manufactured by Nippon Oil and Fats Co., Ltd.) was added and dispersed therein. After the dispersion was heated to 50° C. to dissolve the surfactant, the solution was cooled to 30° C. Separately, 92 g of an 80% by weight aqueous acrylic acid solution was placed in a 500 ml Erlenmeyer flask, and 152.6 g of a 20.1% by weight aqueous sodium hydroxide solution was added dropwise while cooling with ice from outside for a 75 mol % neutralization, after which 0.11 g of potassium persulfate was added and dissolved therein. This partially neutralized aqueous acrylic acid solution was added to the four-necked flask and dissolved therein, and the inner atmosphere of the system was sufficiently replaced with nitrogen, after which the temperature was raised, so that the first stage of polymerization reaction was carried out by keeping a bath temperature at 70° C. The polymerization slurry solution was then cooled to 20° C., and 29.4 g of a low-density polyethylene (trade name: "FLOTHENE UF-80," median grain size 25 μm, melting point 106° C., manufactured by Sumitomo Seika Chemicals Co., Ltd.) was placed into the system, and the water and n-heptane were distilled off by distillation, followed by drying, to yield 127.4 g of a high water-absorbent resin composition, in which the thermoplastic resin was fixed around the high water-absorbent resin and formed as a composite.

Comparative Example 1

A high water-absorbent resin composition was obtained in the same manner as in Example 1 except that the thermoplastic resin was not added. Since the obtained high water-absorbent resin composition was in the form of from 5 to 6 mm lumps, it was pulverized to from 300 to 500 μm size.

TABLE 2

| Ex. | High Water-Absorbent Resin | | Adhesive Binder*[)] | | Thermoplastic Resin | |
| --- | --- | --- | --- | --- | --- | --- |
| 1 | AQUA KEEP SA-60 (Ave. grain size 450 μm) (manufactured by Sumitomo Seika Chemicals Co., Ltd.) | 100 parts by weight | (a) | 10 parts by weight | Low-Density Polyethylene FLOTHENE A-1003 Ave. grain size: 300 μm Melting Point: 106° C. (manufactured by Sumitomo Seika Chemicals Co., Ltd.) | 20 parts by weight |
| 2 | AQUA KEEP 10SH-P (Ave. grain size 250 μm) (manufactured by Sumitomo Seika Chemicals Co., Ltd.) | 100 part by weight | (b) | 10 parts by weight | Ethylene-Vinyl Acetate Copolymer FLOVAC D2051 Ave. grain size: 250 μm Softening Point: 56° C. (manufactured by Sumitomo Seika Chemicals Co., Ltd.) | 30 parts by weight |
| 3 | SANWET IM-1000 (Ave. grain size 400 μm) (manufactured by Sanyo Chemical Industries Ltd.) | 100 parts by weight | (c) | 20 part by weight | Copolymer Polyamide AMIRAN 842P Ave. diameter: 50 μm Length: 500 μm Melting Point: 120 to 130° C. (manufactured by Toray Industries, Ltd.) | 50 parts by weight |
| 4 | AQUALIC CA(K Series) (Ave. grain size 250 μm) (manufactured by Nippon Shokubai Kagaku Industries, Ltd.) | 100 parts by weight | (d) | 50 parts by weight | Polyester BYRON GM-900 (manufactured by Toyobo Co., Ltd.) Ave. grain size: 75 μm Melting Point: 113° C. | 75 parts by weight |
| 5 | AQUA KEEP 10SH-NF (Ave. grain size 60,um) (manufactured by Sumitomo Seika Chemicals Co., Ltd.) | 100 parts by weight | (e) | 5 parts by weight | Low-Molecular Weight Polyethylene Wax AC POLYETHYLENE 1702 Ave. grain size: 200 μm Softening Point: 85° C. (manufactured by Allied Signal) | 10 parts by weight |
| 6 | AQUA KEEP 10SH-NF (Ave. grain size 60 μm) (manufactured by Sumitomo Seika Chemical Co., Ltd.) | 100 parts by weight | — | — | Spherical Ethylene-Acrylic Acid Copolymer FLOBEADS EA-209 Ave. grain size: 10 μm Melting Point: 90° C. (manufactured by Sumitomo Seika Chemicals Co., Ltd.) | 10 parts by weight |

TABLE 2-continued

| Ex. | High Water-Absorbent Resin | Adhesive Binder[*)] | Thermoplastic Resin | |
|---|---|---|---|---|
| 7 | Product Obtained by Reverse-Phase Suspension Polymerization (Ave. grain size 150 μm) | 100 parts by weight | — — | Low-Density Polyethylene FLOTHENE UF-80 Ave. grain size: 25 μm Melting Point: 106° C. (manufactured by Sumitomo Seika Chemicals Co., Ltd.) | 30 parts by weight |
| Compar. Ex. 1 | AQUA KEEP SA-60 (Ave. grain size 450 μm) (manufactured by Sumitomo Seika Chemicals Co., Ltd.) | 100 part by weight | — — | — | — |

Remarks [*)] Calculated as a solid component.

Production Example 1

The high water-absorbent resin composition obtained in Example 1 was spread at 100 g/m² on a pulp sheet (trade name: "Reed Cooking Paper," manufactured by Honshu Paper Co., Ltd., 100×100 mm, weight: 42 g/m²). After another pulp sheet was covered thereon to provide a sandwich structure, a water-absorbent material (sheet) was obtained by pressing to adhere onto the entire surface for 5 seconds at a temperature of 130° C. and a pressure of 1 kg/m² using a heat seal tester (Tester Sangyo TP-701).

Production Example 2

The high water-absorbent resin composition obtained in Example 2 was spread at 100 g/m² on one side of a pulp sheet (trade name: "Reed Cooking Paper," manufactured by Honshu Paper Co., Ltd., 100×100 mm, weight: 42 g/m²).

Thereafter, a water-absorbent material (sheet) was obtained by heat-treating the mentioned resin composition to adhere onto the pulp sheet for 1 minute at 150° C. using a hot air dryer.

Production Example 3

A water-absorbent material (sheet) made of a pulp sheet was obtained in the same manner as in Production Example 1 except that the high water-absorbent resin composition obtained in Example 3 was spread at 300 g/m² on a pulp sheet (trade name: "Reed Cooking Paper," manufactured by Honshu Paper Co., Ltd., 100×100 mm, weight: 42 g/m²).

Production Examples 4–8

Each of water-absorbent materials (sheets) made of pulp sheets was obtained in the same manner as in Production Example 1 except that the high water-absorbent resin compositions obtained in Examples 4–7 and Comparative Example 1 were used.

Test Example

The water-absorbent materials (sheets) made of pulp sheets obtained in Production Examples 1–8 were used to measure the adhesion and the amount of water absorbed by the following method, and to observe the detachment condition of the gel at the time of absorbing water.

(1) Measurement method for adhesion strength

A water-absorbent material (sheet) for testing with its edge alone adhered was prepared in the same manner as in Production Examples except that only the edge of 25 mm width (adhesion area 25×100 mm) were pressed for adhesion. This sheet was cut into 25 mm wide pieces at a right angle to the longitudinal direction of the adhesion portions to obtain 25×100 mm test pieces. The adhesion of the adhesion portion (25×25 mm) was determined using an autograph (AG-500 model, manufactured by Shimadzu Corporation) (peeled at 180 degrees; a peeling speed: 50 mm/min).

(2) Measurement method for the amount of water absorbed

On a 200-mesh standard sieve was placed the water-absorbent material (sheet) obtained in each Production Example, followed by immersion in a 0.9% physiological saline for 10 minutes. Thereafter, the sheet was taken out together with the sieve and excess water was removed, followed by weighing and calculation of the amount of water absorbed as follows:

$$\text{Amount of water absorbed (g/m}^2\text{)} = \frac{\left[\text{Weight after Immersion (g)} - \text{Weight before Immersion (g)}\right]}{0.01}$$

(3) Gel detachment ratio

After the above determination of the amount of water absorbed, the water-absorbent sheet was taken out from the sieve and weighed (A), and the ratio of water-absorbent gel which detached from the sheet was calculated from the weight of water-absorbent gel remaining on the sieve (B) and the weight after water absorption of pulp sheet alone (C):

$$\text{Water-Absorbent Gel Detachment Ratio (\%)} = [B/(A-C)+B] \times 100$$

The results are shown in Table 3.

TABLE 3

| | High Water-Absorbent Resin Composition | Adhesion Strength (g/25 mm width) | Amount of Water Absorbed (g/m²)* | Gel Detachment Ratio (%) |
|---|---|---|---|---|
| Production Example 1 | Example 1 | >200 (Breaking of Base Material) | 5050 | 0 |
| 2 | 2 | — | 4800 | 0 |
| 3 | 3 | >230 (Breaking of Base Material) | 8700 | 0 |
| 4 | 4 | >250 (Breaking of Base Material) | 3000 | 0 |
| 5 | 5 | >190 (Breaking of Base Material) | 5250 | 0 |
| 6 | 6 | >150 (Breaking | 5540 | 4.0 |

TABLE 3-continued

| High Water-Absorbent Resin Composition | Adhesion Strength (g/25 mm width) | Amount of Water Absorbed (g/m²)* | Gel Detachment Ratio (%) |
| --- | --- | --- | --- |
| 7 | 7 of Base Material) >165 (Breaking of Base Material) | 5100 | 2.0 |
| 8 | Comparative Example 1 | 0 | 6700 | 100 |

Remarks *)Amount of water absorbed for the pulp sheet (Reed Cooking Paper) only was 1200 g/m².

The water-absorbent materials using one of the high water-absorbent resin compositions obtained in Examples 1–7 of the present invention were found to have a high adhesion and a very low gel detachment ratio with no significant reduction in the amount of water absorbed, while the water-absorbent material using the high water-absorbent resin composition obtained in Comparative Example 1 had no sufficient adhesion so that the entire gel detached from the sheet, though it had a large amount of water absorbed.

INDUSTRIAL APPLICABILITY

When the high water-absorbent resin composition of the present invention is used, it is possible to securely adhere a high water-absorbent resin to a fibrous base material merely by thermal adhesion, so that a water-absorbent material which stably retains the high water-absorbent resin even after absorbing water can be obtained. Accordingly, the base materials, such as fibrous base materials, can retain more amount of high water-absorbent resin than those of conventional water-absorbent materials. Thus, when the high water-absorbent resin composition of the present invention is used, it is possible to produce water-absorbent composites suitable for various applications, including hygienic materials, such as paper diapers and sanitary napkins, and agricultural, horticultural, food, and other industrial materials.

We claim:

1. A high water-absorbent resin composition, produced by forming a composite by fusing or fixing a thermoplastic resin onto a surface of high water-absorbent resin via an adhesive binder, wherein the composition comprises from 1 to 100 parts by weight of the thermoplastic resin and from 1 to 75 parts by weight of the solid component of the adhesive binder, based on 100 parts by weight of the high water-absorbent resin, and wherein said composite is obtained by the following steps:

stirring and mixing the high water-absorbent resin and a solvent containing the adhesive binder;

adding the thermoplastic resin, followed by further stirring and mixing;

distilling off the solvent in the adhesive binder while heating; and then raising the temperature to a temperature sufficient to fuse the thermoplastic resin onto the surface of the high water-absorbent resin but not sufficient to coalesce the thermoplastic resin.

2. A high water-absorbent resin composition, produced by forming a composite by fusing or fixing a thermoplastic resin onto a surface of a high water-absorbent resin, wherein the composition comprises from 1 to 100 parts by weight of the thermoplastic resin, based on 100 parts by weight of the high water-absorbent resin, and wherein said composite is obtained by the following step:

raising the temperature, while mixing and stirring the high water-absorbent resin and the thermoplastic resin, to a temperature sufficient to fuse the thermoplastic resin onto the surface of the high water-absorbent resin but not sufficient to coalesce the thermoplastic resin.

3. The high water-absorbent resin composition according to claim 1, wherein the adhesive binder is a urethane adhesive.

4. The high water-absorbent resin composition according to claim 1 or 2, wherein the high water-absorbent resin has an average grain size of from 5 to 1000 μm, and the thermoplastic resin is a granular product having an average grain size of from 1 to 800 μm, or a fibrous product having an average diameter of from 1 to 400 μm and an average length of from 2 to 1000 μm.

5. The high water-absorbent resin composition according to claim 1 or 2, the thermoplastic resin has a melting point of from 50° to 200° C.

6. A high water-absorbent resin composition, produced by forming a composite by fixing a thermoplastic resin in the form of grains onto a surface of a high water-absorbent resin via an adhesive binder, wherein the composition comprises from 1 to 100 parts by weight of the thermoplastic resin and from 1 to 75 parts by weight of the solid component of the adhesive binder, based on 100 parts by weight of the high water-absorbent resin, and wherein said composite is obtained by the following steps:

stirring and mixing the high water-absorbent resin and a solvent containing the adhesive binder;

adding the thermoplastic resin, followed by further stirring and mixing; and distilling off the solvent in the adhseive binder while heating, and thereby fixing the grains of thermoplastic resin onto the surface of the high water-absorbent resin via the adhesive binder.

7. A high water-absorbent resin composition, produced by forming a composite by fixing a thermoplastic resin in the form of grains onto a surface of a high water-absorbent resin, wherein the composition comprises from 1 to 100 parts by weight of the thermoplastic resin, based on 100 parts by weight of the high water-absorbent resin, and wherein said composite is obtained by the following steps:

adding the thermoplastic resin during a production process of the high water-absorbent resin; and heating and drying, and thereby fixing the grains of thermoplastic resin onto the surface of the high water-absorbent resin.

8. A composition, comprising a high water-absorbent resin having grains of a thermoplastic resin fused or fixed to a surface thereof, wherein said grains of thermoplastic resin do not coalesce together and are fused or fixed in such a small amount that the water absorption capacity and water absorption rate of said water-absorbent resin is not substantially reduced, and wherein said composition comprises from 1 to 100 parts by weight of the thermoplastic resin per 100 parts by weight of the high water-absorbent resin.

9. The composition according to claim 8, wherein said thermoplastic resin is fused or fixed to the surface of the high water-absorbent resin via an adhesive binder, which is contained in an amount of from 1 to 75 parts by weight of the solid component therein per 100 parts by weight of the high water-absorbent resin.

10. The composition according to claim 8, wherein said water-absorbent resin is selected from the group consisting of crosslinked acrylate polymers, crosslinked products of vinyl alcohol-acrylate copolymers, crosslinked products of polyvinyl alcohols grafted with maleic anhydride, crosslinked products of acrylate-methacrylate copolymers, crosslinked saponification products of methyl acrylate-vinyl acetate copolymers, crosslinked products of starch-acrylate graft copolymers, crosslinked saponification products of starch-acrylonitrile graft copolymers, crosslinked products of carboxymethyl cellulose polymers, and crosslinked products of isobutyrene-maleic anhydride copolymers.

11. The composition according to claim 10, wherein said thermoplastic resin is selected from the group consisting of ethylene-vinyl acetate copolymers, ethylene-acrylic acid copolymers, ethylene-acrylic ester copolymers, ethylene-acrylic ester-maleic anhydride terpolymers, polyethylene, low-molecular weight polyethylene waxes, polyesters, polyurethanes, polyamides, and polypropylene.

* * * * *